UNITED STATES PATENT OFFICE.

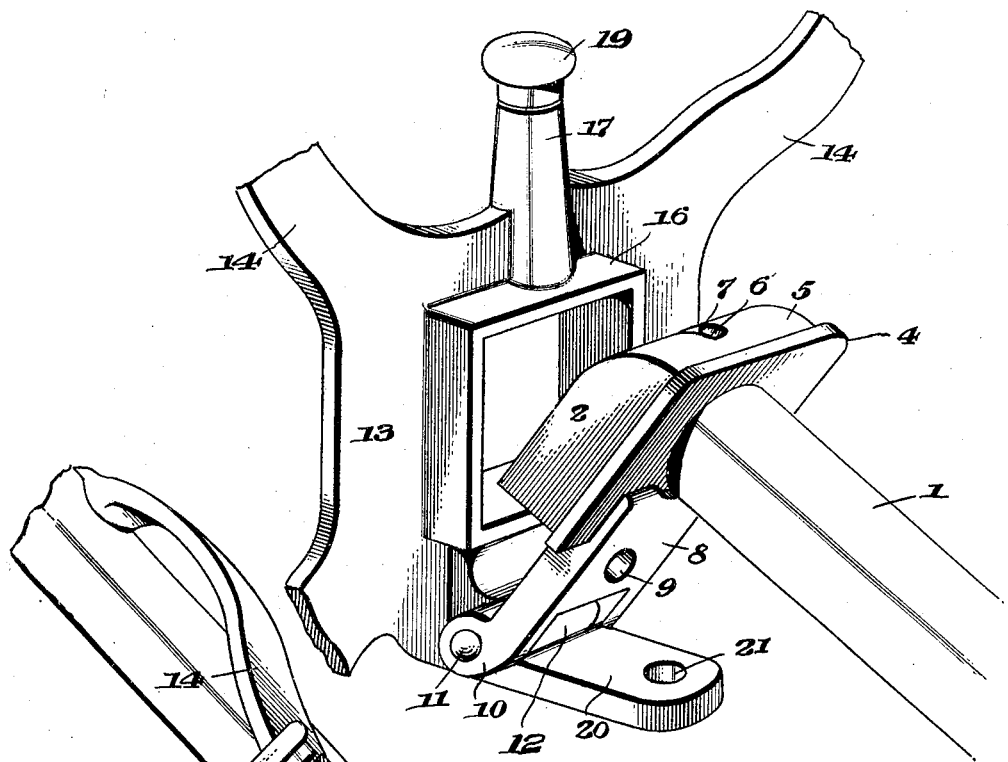

WILLIAM H. APPLEBY, OF WINDSOR, ONTARIO, CANADA.

STEERING-WHEEL.

1,341,032.  Specification of Letters Patent.  Patented May 25, 1920.

Application filed May 19, 1919. Serial No. 298,342.

*To all whom it may concern:*

Be it known that I, WILLIAM H. APPLEBY, a subject of the King of England, residing at Windsor, in the county of Essex, Province of Ontario, Dominion of Canada, have invented certain new and useful Improvements in Steering-Wheels, of which the following is a specification, reference being had therein to the accompanying drawings.

This invention relates to steering wheels especially designed for the steering post or column of an automobile or similar motor vehicle, although it is applicable to the steering gears of motor boats, air craft or any structure having a rotatable member adapted to be manually operated.

The objects of my invention are to provide a novel steering wheel that may be adjusted toward or from the operator of a vehicle for the purpose of giving free ingress to and egress from the vehicle, and to furnish a steering post or column with a steering wheel that may be shifted from a plane at a right angle to the axis of a steering post to a plane substantially parallel to the axis of the steering post.

Other objects of my invention are to furnish the upper end of a steering post with a tiltable steering wheel or member that will be positively held against accidental displacement during the rotation of the steering post, and to provide positive and reliable means, in a manner as hereinafter set forth for safely supporting a steering wheel in an inactive locked position, so that the steering mechanism of an automobile or other vehicle cannot be surreptitiously used.

The above and other objects are attained by a simple, durable and inexpensive mechanical construction that will be hereinafter more fully described and then claimed, and reference will now be had to the drawing, wherein Figure 1 is a perspective view of the steering wheel relative to a steering post, showing the wheel partly tilted;

Fig. 2 is a cross sectional view of the same.

In the drawing, the reference numeral 1 denotes a conventional form of steering post and keyed, splined or otherwise non-rotatably fixed on the upper end of said post is a block 2 having a central opening 3 to receive the bolt and expose the upper end thereof so that suitable means may be employed in connection with the post to prevent accidental displacement of the block. The block 2 is substantially rectangular and has its lower face provided with flanges or ledges 4. The front face of the block is rounded, as at 5, and provided with a socket or opening 6 with which communicates a groove 7, the purpose of which will hereinafter appear.

The block 2 has a rearwardly projecting arm 8 which is apertured, as at 9, and terminates in ears or lugs 10 adapted to be connected by a pivot pin 11 or other pivotal means to the barrel 12 of a wheel spider or frame 13. The wheel spider or frame 13 has radially disposed arms 14 supporting a rim or annular hand grip member 15 and this rim is of a conventional form adapted to be gripped and turned for imparting a rotary movement to the steering post 1.

Centrally of the wheel frame or spider 13 is a rectangular socket 16 having walls corresponding in depth to the block 2 and adapted to rest on the flanges or ledges 4 of said block, with the top of said block flush with the upper face of the frame or spider 13.

At that side of the socket 16 opposite the hinge portion of the wheel frame or spider 13 is a holder 17 for a spring pressed detent or plunger 18 which has the inner end thereof protruding into the opening formed by the walled socket 16 and the outer end of said detent or plunger is provided with a suitable knob or finger piece 19, so that the detent or plunger may be retracted, particularly when it is desired to swing the wheel from an active position to an inactive position.

The wheel frame or spider 13, adjacent the arm 8, has an apertured lug 20 and the opening 9 in the arm 8 is adapted to register with the aperture 21 in the lug 20 so that the shackle 22 of a padlock 23 may be employed to lock the arm 8 in engagement with the lug 20 so that the wheel will be positively held in an inactive position, in a plane approximately parallel to the axis of the steering post 1, whereby the steering wheel cannot be conveniently used for steering purposes. The padlock 23 is an example of various types of locks that may be utilized for locking purposes in connection with my improved steering wheel.

Considering Fig. 2, it is only necessary to remove the lock 23 and then the wheel may be swung to an active position in a plane at a right angle to the axis of the steering post 1. As the wheel is swung downwardly to place the socket 16 over the block 2, the inner end of the detent or plunger 18 impinges against the block 2 and rides in the groove 7 of said block until the detent or plunger alines with the opening or socket 6, at which time the expansive force of the spring associated with the detent or plunger is sufficient to shift the detent or plunger into engagement with the block and thereby automatically lock the wheel in an active position. The wheel will be supported on the flanges or ledges 4 of the block 2 and cannot be rotated independent of the steering post 1. The lock 21 may be connected to the apertured lug 20 so that it will always be convenient for locking purposes when the steering wheel is swung to an inactive position.

It is thought that the operation and utility of the steering wheel will be apparent without further description, and while in the drawing there is illustrated a preferred embodiment of my invention, it is to be understood that the structural elements are susceptible to such variations and modifications as fall within the scope of the appended claim.

What I claim is:—

The combination of a steering post, a block fixed thereon, an arm carried by said block, a wheel frame hinged to said arm and adapted to fit over said block, a lug integral with said wheel frame, and a lock adapted to extend through said arm and lug to maintain said wheel frame in an inactive position relative to said steering post.

In testimony whereof I affix my signature in the presence of two witnesses.

WILLIAM H. APPLEBY.

Witnesses:
KARL H. BUTLER,
ANNA M. DORR.